United States Patent [19]

du Plessis et al.

[11] Patent Number: 5,575,365

[45] Date of Patent: Nov. 19, 1996

[54] OVERSPEED PROTECTION SYSTEM FOR A VEHICLE

[76] Inventors: Nico du Plessis, 3 Alexander Street Extension 1; Glen R. Steel; Gary G. J. Port, both of P.O. Box 4329, all of Vereeniging, South Africa

[21] Appl. No.: 361,949

[22] Filed: Dec. 22, 1994

[51] Int. Cl.⁶ .................................................. B60K 41/24
[52] U.S. Cl. .............. 192/12 R; 192/12 C; 192/105 BA
[58] Field of Search ................. 192/12 R, 12 C, 192/13 R, 105 A, 105 BA; 303/122, 125, 116.1

[56] References Cited

U.S. PATENT DOCUMENTS

| | | | |
|---|---|---|---|
| 1,594,259 | 7/1926 | Hardman | 192/105 A |
| 2,017,352 | 10/1935 | Quick | 254/187.4 |
| 2,468,092 | 4/1949 | Mahnke | 254/173 R |
| 2,652,230 | 9/1953 | Hoyle et al. | 254/173 R |
| 2,778,469 | 1/1957 | McIntyre | 192/105 BA |
| 2,833,384 | 5/1958 | Wilson | 192/105 BA |
| 3,187,871 | 6/1965 | Rice | 192/105 BA |
| 3,367,465 | 2/1968 | Newman | 192/105 BA |
| 3,610,382 | 10/1971 | Makinson | 192/105 BA |
| 4,175,727 | 11/1979 | Clarke | 192/12 R X |

*Primary Examiner*—Andrea L. Pitts
*Attorney, Agent, or Firm*—Woodcock Washburn Kurtz Mackiewicz & Norris

[57] ABSTRACT

The invention provides an overspeed protection system for a vehicle such as a mine skip travelling along a vertical set of rails 60. In use an idler wheel 62 in contact with a rail 60 rotates a shaft 12 forming part of a clutch 10 at speeds which are directly proportional to the linear travelling speed of the vehicle. When the rotational speed of the shaft 12 exceeds a predetermined limit the clutch 10 frictionally transfers torque from the shaft 12 to a shaft 14, which in turn drives an hydraulic pump 64. The pump 64 pressurises hydraulic fluid in a supply line 67 until it opens a valve 68, which admits a pressurised fluid from a reservoir 74 into a braking means 80, which performs a clamping action on an associated rail 60 to restrain the motion of the vehicle.

4 Claims, 3 Drawing Sheets

OVERSPEED PROTECTION SYSTEM FOR A VEHICLE

FIELD OF THE INVENTION

This invention relates to an overspeed protection system for a vehicle travelling along a track. The invention relates more particularly to an overspeed protection system for use on a vehicle such as a mine cage, skip, or the like, running along a vertical track.

BACKGROUND TO THE INVENTION

Vehicles such as mine skips generally travel along vertically mounted tracks within mine shafts. The skips are raised and lowered by means of steel wire ropes wound onto rotatable drums. Any failure of a wire rope is generally fatal to the occupants unless some means of timeously restraining it is provided.

Electrically powered systems are generally considered unsatisfactory for this purpose since any power supply cable must generally be wound and unwound in unison with the wire rope by which the skip is suspended. Furthermore electrical cables are likely to be severed at roughly the same time when a wire rope fails, thereby rendering any safety equipment associated with the cables inoperative.

The present invention seeks to address these shortcomings.

SUMMARY OF THE INVENTION

In a first aspect of the invention there is provided an overspeed protection system on a vehicle, which includes a) a shaft having a longitudinal axis about which it is rotatable, the said shaft being mounted on the vehicle while being rotatable at speeds proportional to the speed of travel of the vehicle;

b) activating means for activating a braking means on the vehicle to reduce the travelling speed of the vehicle; and c) a releasable clutch interposed between the said shaft and the activating means, the clutch being operable to transmit torque from the shaft to the activating means whenever the speed of rotation of the shaft exceeds a predetermined value.

The activating means may include a hydraulic pump for hydraulically opening a valve on a pressurised fluid supply to the braking means. Used on a vehicle travelling along one or more rails, the braking system preferably includes braking means capable of performing a clamping action on at least one associated rail.

The invention extends to a clutch suitable for use in an overspeed protection system on a vehicle, which includes a) a shaft having a longitudinal axis about which the shaft is rotatable at speeds varying proportionally with the travelling speed of the vehicle;

b) a cylindrical drum spaced from the said shaft, and arranged in co-axial relationship to it; and c) at least one frictional element which is connected to the said shaft and biased towards its longitudinal axis, each frictional element being frictionally engageable with the drum when the speed of rotation of the first shaft exceeds a predetermined value.

The clutch may include a pair of resilient biasing means which tend to urge a corresponding pair of frictional elements towards each other. The biasing means may be mounted on a common carrier which is secured to the said shaft, the carrier being preferably arranged in co-axial relationship to the shaft.

Each biasing means may include a helical spring arranged within a pair of complementary, telescopically extendible sleeves. Adjusting means may be provided on each pair of sleeves for adjusting the clearance space between each frictional element and an adjacent surface of the drum.

A further shaft may be provided for transferring torque from the cylindrical drum to a driven unit, such as a hydraulic pump, whenever each frictional element bears against the drum. The said further shaft is conveniently connected directly to the drum, and arranged in co-axial relationship to it.

In a further aspect of the invention there is provided a method of protecting a vehicle against an overspeed condition, which includes the steps of a) carrying a rotatable shaft on the vehicle, the shaft being rotatable at speeds proportional to the travelling speed of the vehicle; and b) engaging a clutch co-operating with the rotatable shaft whenever its speed of rotation exceeds a predetermined value, thereby activating a braking means on the vehicle.

The clutch is preferably designed to transfer torque from the rotatable shaft to a hydraulic pump, which in turn co-operates with the braking means on the vehicle. More particularly, the pump may serve to pressurise a supply of hydraulic fluid for opening a release valve on a pressurised fluid supply for activating the braking means on the vehicle.

BRIEF DESCRIPTION OF THE DRAWINGS

The invention is described below by way of example with reference to the accompanying diagrammatic drawings, in which.

DESCRIPTION OF A PREFERRED EMBODIMENT OF THE INVENTION

Figure 1:
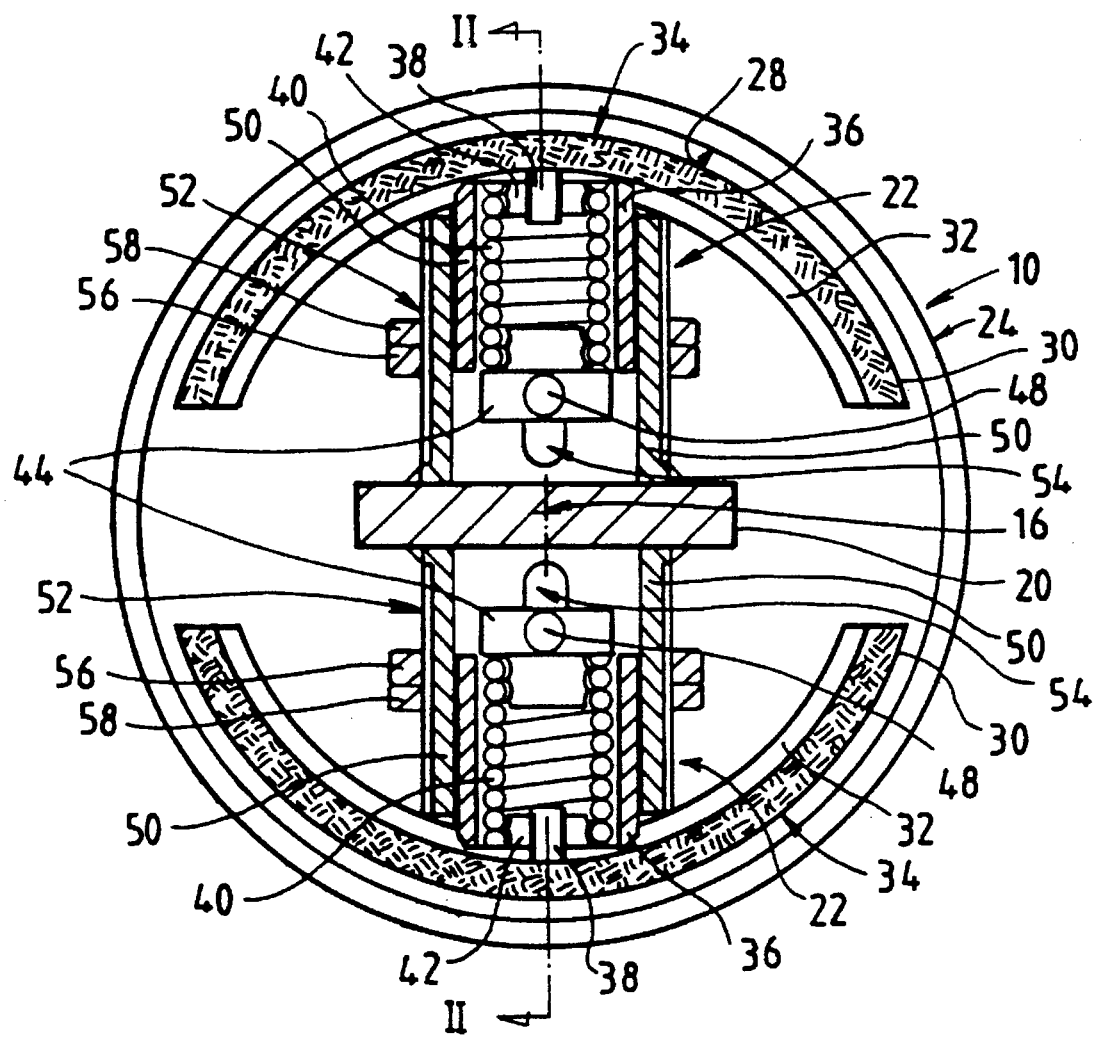
FIG. 1 shows a cross sectional view of a clutch for use in an overspeed protection system according to the invention, viewed as a cross section taken at I—I in FIG. 2.

In the drawings reference numeral 10 generally identifies a clutch according to the present invention. The clutch 10 includes first and second shafts 12 and 14 respectively, which are aligned with each other along a common longitudinal axis 16.

The first shaft 12 is connected to one face of a circular plate 18 centered on the axis 16. A rectangular plate 20 is welded along one of its edges to the opposing face of the plate 18, and is arranged in symmetrical relationship about the axis 16. The plate 20 provides a carrier for a pair of resilient biasing means, generally denoted by reference numeral 22. The biasing means 22 are respectively mounted on opposing faces of the plate 20, and project radially outwardly from the axis 16.

The second shaft 14 is connected to a cylindrical drum 24 having a circular end-plate 26 to which the shaft 14 is welded. The drum 24 is circular in cross-section and arranged in co-axial relationship with the axis 16. The plate 18 on the first shaft 12 fits into the drum 24 with slight clearance within the curved inner walls 28 of the drum 24, thereby providing a protective dust shield for the components located inside the drum, described more fully below.

Two curved friction pads 30 are arranged within the drum 24, and are respectively mounted on each biasing means 22. Each pad 30 is supported on a curved carrier plate 32 generally conforming with the curvature of the inner walls 28 of the drum 24. Each pad 30 presents an outwardly curved surface 34 having a radius of curvature that is so designed that a uniform space of approximately 1 mm is maintained between the installed pads and the inner walls 28 of the drum 24 when the clutch is inoperative.

Each biasing means 22 includes a steel nozzle 36 which seats in a recess in a respective carrier plate 32, to which it is welded The nozzles 36 project radially inwardly towards the axis 16. A threaded stud 38 is centered within each nozzle 36 and is welded to its respective carrier plate 32, each stud and nozzle being arranged in co-axial relationship to each other.

Each stud 38 supports a helical spring 40 having a first circular end plate 42 held captive within the spring. Each end plate 42 defines a central bore with female thread formations matching the thread on the studs 38, thereby ensuring that each spring 40 remains centered within its associated nozzle 36.

A second circular end-plate 44, having a diameter marginally smaller than the inner bore of the nozzle 36, is secured to each spring 40 at the opposing end to which the first end-plate 42 is secured. Each end-plate 44 defines a transverse passage 46 extending along its diameter, and defines female thread formations matching the threads of a pair of locating pins 48 which are receivable into opposing ends of each passage.

Figure 2:
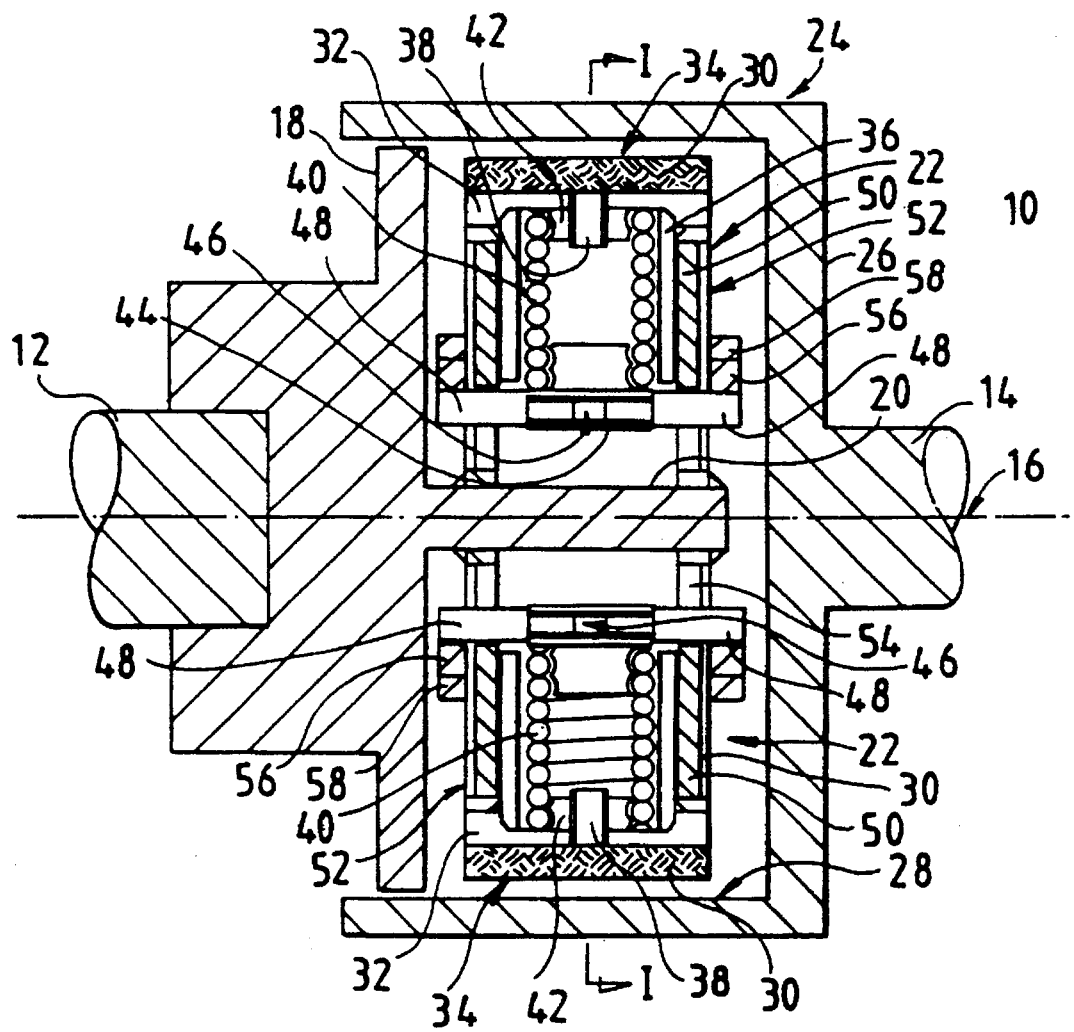
FIG. 2 shows a side elevation of the clutch of FIG. 1 viewed as a section taken at II—II in FIG. 1.

The rectangular plate 20 shown towards the end of the first shaft 12 in FIGS. 1 and 2 supports a pair of nozzles 50 welded to two opposing surfaces of the rectangular plate, and extending radially outwardly in relation to the axis 16. Each nozzle 50 has an inner bore slightly larger than the outer diameter of the nozzles 36, thereby allowing each nozzle 50 to slide over an associated nozzle 36 when these are displaced in axial relationship with each other. Each pair of nozzles 36 and 50 accordingly constitutes a set of telescopically extendible sleeves surrounding each spring 40.

Each nozzle 50 defines external thread formations 52 and a pair of diametrically opposed slots 54 within which the locating pins 48 are held loosely captive. An adjusting nut 56 and a lock nut 58 thread onto the thread formations 52 of the nozzles 50, as shown in FIGS. 1 and 2.

Each adjusting nut bears against an adjacent pair of locating pins 48 so that the outwardly facing surfaces of the friction pads 30 lie on the circumference of a common circle having a diameter approximately 2 mm less than the inner bore of the drum 24 when the springs 40 are in their relaxed state. The lock nuts 58 are then tightened to maintain the adjusting nuts 56 in their desired positions.

The clutch 10 is completed by sliding the assembly comprising the first shaft 12, the biasing means 22 and the friction pads 30 into the drum 24. The alignment of the shafts 12 and 14 is conveniently checked and corrected as far as necessary during the installation of the clutch 10.

Figure 3:
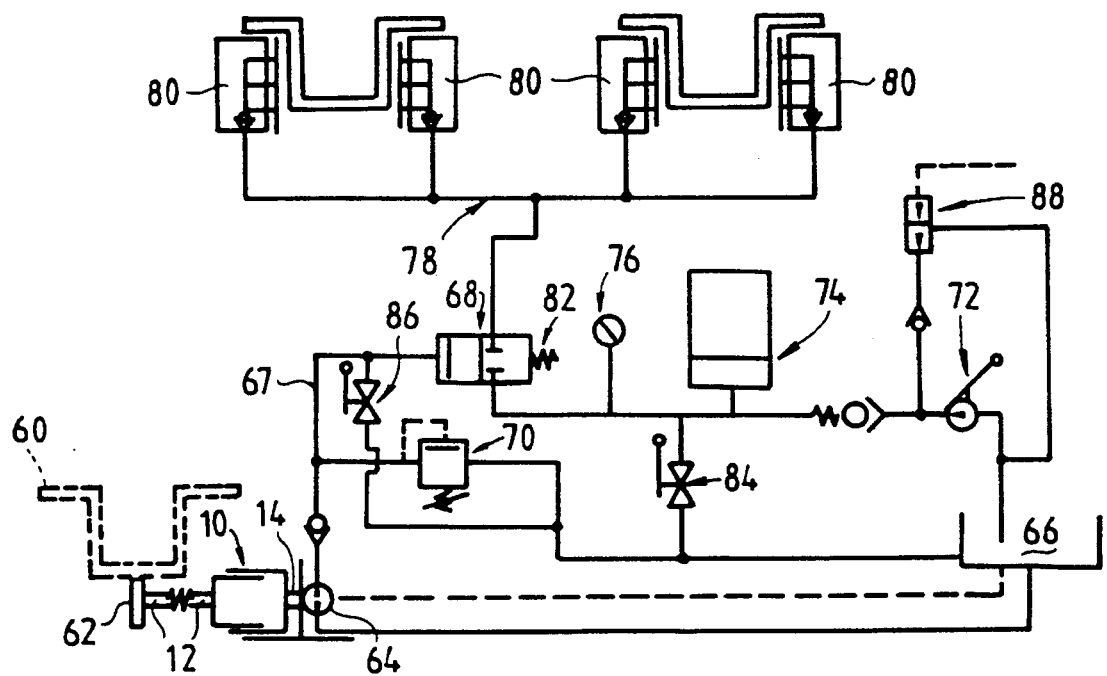
FIG. 3 shows a schematic flow diagram of an overspeed protection system for a vehicle according to the present invention, incorporating the clutch of FIGS. 1 and 2.

The schematic diagram of FIG. 3 shows a particularly preferred application of the clutch 10 in an overspeed protection system on a skip (not further illustrated) for use in a vertical mine shaft. The skip is conveniently arranged between four vertically extending rails, denoted by reference numeral 60 in FIG. 3, arranged in opposing pairs. FIG. 3 shows two of these rails 60 in cross-section. The skip is conveniently equipped with idlers or similar wheels arranged in known fashion to keep the skip centered between the rails 60.

The clutch 10 is conveniently mounted on the roof of the skip together with the further equipment described more fully below to provide an overspeed protection system according to the present invention.

An idler wheel 62 is connected to a shaft which is supported on the skip. The shaft is connected to the first shaft 12 of the clutch 10 by means of a direct coupling. The idler wheel 62 is spring-loaded to keep it in frictional contact with its associated rail 60, shown in broken outline in FIG. 3. During use the speed of rotation of the shaft 12 is hence directly proportional to the linear travelling speed of the skip.

The second shaft 14 of the clutch 10 is connected to a bi-directional hydraulic pump 64 which draws hydraulic fluid from a reservoir 66 and in use delivers pressurised hydraulic fluid through a supply line 67 to a hydraulic valve 68. A relief valve 70 is provided to return pressurised hydraulic fluid to the reservoir 66 at pressures exceeding that required to activate the valve 68.

The hydraulic valve 68 has an inlet port connected to a supply of constantly pressurised hydraulic fluid. This fluid is also drawn from the reservoir 66 by means of a manually operable pump 72, which delivers hydraulic fluid at a pressure in the order of 25 bar to an accumulator 74 of known construction.

The accumulator 74 essentially comprises a vessel which accommodates a pre-tensioned spring bearing against a flexible membrane (not shown). The hydraulic fluid is confined within the accumulator 74 by means of the membrane while the pre-tensioned spring maintains a steady fluid pressure.

A pressure gauge 76 is provided on a line interconnecting the accumulator 74 with the inlet port of the valve 68 for the purposes of routine inspection.

The valve 68 includes an outlet port connected to a manifold 78 for delivering pressurised hydraulic fluid to a system of brake units 80. These units operate in pairs, each pair being arranged on opposing sides of a rail 60 to operate in calliper-like fashion.

Each brake unit 80 includes a body conveniently defining three parallel bores in fluid communication with a common hydraulic fluid inlet port. Three pistons are arranged within the respective bores to act on a common backing plate which carries a layer of frictional material of known composition, generally used for brake linings.

The valve 68 includes a displaceable spring-loaded plunger defining an internal flow passage. This passage is normally kept out of alignment with the inlet and outlet ports of the valve 68 by means of a spring 82, thereby rendering the brake units 80 inoperative.

During normal use of the skip the shaft 12 of the clutch 10 co-rotates with the idler wheel 62, which serves to monitor the travelling speed of the skip along the rails 69. The friction pads 30 within the drum 24 accordingly rotate in unison with the shaft 12. It is evident from FIGS. 1 and 2 that these friction pads 30 progressively move in a radially outward direction against the bias of the springs 40 as the speed of rotation of the wheel 62 and the shaft 12 increases.

A point is reached where the speed of rotation exceeds a predetermined value of say 3500 rpm, signaling damage to the wire rope from which the skip is suspended. The pads 30 now bear against the inner walls 28 of the drum 24. The shaft 12 accordingly delivers torque to the shaft 14 by way of the clutch 10, thereby setting the pump 64 in motion and causing it to inject pressurised hydraulic fluid into the supply line 67.

The hydraulic fluid urges the plunger in the valve 68 against the bias of the spring 82 until a flow passage is established between the inlet and outlet ports of the valve. Pressurised hydraulic fluid now issues from the accumulator 74 into the manifold 78, thereby urging the brake pads of each opposed pair of brake units 80 towards each other. Each pair of brake units 80 accordingly exercises a clamping action on their associated rail 60 extending between them.

This clamping action arrests the motion of the skip for as long as the fluid pressure in the manifold 78 is sustained. This generally allows sufficient time to secure the skip by whatever means are available until the normal drive of the skip is re-established.

The brake units 80 are conveniently released by manually operating a ball valve 84 whereby hydraulic fluid is returned from the accumulator 74 back to the reservoir 66. At the same time a ball valve 86 linked to the supply line 67 is opened to relieve any residual pressure in this line, thereby allowing the valve 68 to restore itself to its normally shut condition. The fluid communication between the accumulator 74 and the manifold 78 is once again interrupted.

The ball valves 84 and 86 are subsequently shut again. If a compressed air supply is available, the accumulator 74 is conveniently recharged by means of a pneumatic pump 88 arranged in parallel with the manually operable pump 72, as illustrated in FIG. 3. The skip is hence restored to its normal operative condition and the overspeed protection system described above is again available for use.

A skilled reader will appreciate that the described preferred embodiment lends itself to a variety of modifications and adaptations, all falling within the scope of the accompanying claims. The scope of these claims should accordingly not be construed as being limited in any way by the features of the preferred embodiment described above.

We claim:

1. An overspeed protection systems for use in conjunction with a vehicle, comprising:

a. a rotatable shaft which is mountable on the vehicle, the shaft being rotatable at speeds proportional to the speed of travel of the vehicle;

b. a rotatable hydraulic pump for hydraulically opening a valve for releasing pressurized fluid to activate a braking system to reduce the traveling speed of the vehicle; and c. a releasable clutch interposed between the rotatable shaft and the hydraulic pump, the clutch being operable to transmit torque from the rotatable shaft to the hydraulic pump whenever the speed of rotation of the shaft exceeds a predetermined limit.

2. A method of protecting a vehicle against an overspeed condition, comprising the steps of a. carrying a rotatable shaft on the vehicle, the shaft being rotatable at speeds proportional to the traveling speed of the vehicles; and b. engaging a clutch for transferring torque from the rotatable shaft to a hydraulic pump whenever the monitored speed of rotation of the shaft exceeds a predetermined value, thereby activating a braking means on the vehicle.

3. A method according to claim 2, in which the clutch serves to transfer torque from the rotatable shaft to a hydraulic pump.

4. A method according to claim 3, in which the pump pressurises a supply of hydraulic fluid for opening a release valve for releasing a pressurised fluid supply for activating the braking means on the vehicle.

\* \* \* \* \*